United States Patent [19]

Beadle

[11] Patent Number: 5,134,394
[45] Date of Patent: Jul. 28, 1992

[54] LIGHT AIRCRAFT NAVIGATION APPARATUS

[76] Inventor: Leigh P. Beadle, 375 Tenney Cir., Chapel Hill, N.C. 27514

[21] Appl. No.: 508,963

[22] Filed: Apr. 12, 1990

[51] Int. Cl.$^5$ .............................. G01C 23/00
[52] U.S. Cl. ........................ 340/975; 33/329; 73/178 R; 340/971
[58] Field of Search ............ 340/945, 967, 971, 973, 340/974, 975, 977, 978, 979, 980; 73/178 R; 33/328, 329, 330, 319, 320

[56] References Cited

U.S. PATENT DOCUMENTS

| | | | |
|---|---|---|---|
| 2,176,197 | 10/1939 | Bentley | 33/319 |
| 2,487,809 | 11/1949 | Hoover et al. | 33/319 |
| 2,941,306 | 6/1960 | Vecker | 33/329 |
| 3,634,946 | 1/1972 | Star | 33/356 |
| 3,936,797 | 2/1976 | Andresen, Jr. | 340/977 |
| 4,247,843 | 1/1981 | Miller et al. | 340/973 |
| 4,283,705 | 8/1981 | James et al. | 340/973 |
| 4,347,730 | 9/1982 | Fisher et al. | 73/178 R |
| 4,513,509 | 4/1985 | Nordström | 340/974 |
| 4,598,292 | 7/1986 | Devino | 340/975 |
| 4,626,851 | 12/1986 | Tooze | 340/971 |
| 4,682,171 | 7/1987 | Nakamura | 340/975 |
| 4,860,007 | 8/1989 | Konicke et al. | 340/973 |
| 4,882,845 | 11/1989 | Boyer | 340/973 |

FOREIGN PATENT DOCUMENTS 2042724 9/1980 United Kingdom ............... 33/319

Primary Examiner—Jin F. Ng
Assistant Examiner—Brent A. Swarthout
Attorney, Agent, or Firm—Olive & Olive

[57] ABSTRACT

A gyroscopically stabilized artificial horizon instrument used in light aircraft mounts an earth magnetic field sensitive flux sensor on its gyroscope housing to produce a signal indicative of the direction of flight. The signal is processed and produced as a digital display of direction on the face of the instrument such that the planes relation to the artificial horizon and its direction can be observed by the pilot at the same instrument location. Provision is also made for generating signals indicative of airspeed and altitude and displaying in digital form both airspeed and altitude at the same location on the artificial horizon instrument at which direction is displayed.

5 Claims, 5 Drawing Sheets

LIGHT AIRCRAFT NAVIGATION APPARATUS

BACKGROUND OF INVENTION

1. Field of the Invention

The invention relates to altitude, speed and direction sensing and display apparatus primarily for light aircraft.

2. Background of the Invention

While the present invention is generally directed to sensing and displaying altitude, speed and direction in a digital form, a principal aspect of the invention is that of providing an improved means for displaying direction in digital form on the artificial horizon instrument as found in light aircraft.

The pilot of a conventional light aircraft is required to scan a multitude of instruments in order to be continuously aware of the altitude, speed and direction of the aircraft as well as its relation to the horizon. Vertigo has been known to be induced in these circumstances. A principle object of the present invention thus becomes that of consolidating the display of altitude, speed and direction in digital form on the face of the artificial horizon instrument so that the pilot has effectively only one instrument to scan and one location to observe particularly when critical weather conditions are being encountered. Since another primary object of the invention is that of providing an improved compass for light aircraft which allows the directional sensing unit to be remotely located and the directional signal to be sent by wire to a digital display on the artificial horizon instrument, reference will next be made to certain aspects of the prior art related to compasses.

In the conventional light aircraft a wet compass is used in conjunction with a directional gyro that is either vacuum or electrically operated. When the standard wet compass is used as the sensing unit an associated remote indicating compass is employed to display direction. However, the traditional wet compass has the disadvantage of tending to wobble and give inaccurate readings when the aircraft makes a turn. A further object of the invention thus becomes that of replacing the wet compass system with more reliable instrumentation as well as with instrumentation which is more accessible to the pilot.

A recent development in both the automobile and marine industry is the availability of a solid state compass. For example, a solid state electronic compass for automobile use is made by Zemco, Inc. of Taiwan as Model DE 700. A solid state compass for marine use is also available. In addition, there is also now available a solid state compass having a flux gate sensor with a digital display of direction for use by campers and hikers. Such a compass is made by Nautech, Ltd, Anchorage Park, Portsmouth, Hampshire, England.

While the described available automobile, marine and hiking solid state compasses provide a means for producing a digital display of direction, none of such compasses are useful for indicating aircraft direction since none of such compasses are capable of adapting to coordinated turns as encountered in aircraft flying. While flux gate sensors have been mounted on gimbals for marine applications, a gimbal support, unlike a gyroscope, is unable to maintain itself on a perfect axis parallel to the ground as happens with a gyroscope and as is required for aircraft operation. Further, none of such instruments are easily calibrated for aircraft use and none are immediately adapted to provide a digital display on or in an aircraft instrument panel. Gimbal supports also introduce acceleration and deceleration errors. The present invention on the other hand recognizes the need for utilizing modern solid state compass technology for light aircraft navigation.

In the relatively complex and expensive inertial navigation system used for large aircraft, a digital readout is obtained. Such digital readout may be obtained for air speed, altitude and direction. However, for light aircraft, digital readouts of air speed, altitude and direction are generally not available and it has not been previously known to provide a digital readout of the air speed, altitude and direction, and particularly direction, on the face of the artificial horizon or altitude instrument which is the primary instrument for use when flying under instrument flying conditions in light aircraft since it gives a visual indication of the relation of the aircraft to the horizon. The achieving of this type instrumentation thus becomes an object of the invention.

SUMMARY OF THE INVENTION

The invention provides on the face of the light aircraft artificial horizon instrument digital readouts of air speed, direction and altitude. In a first embodiment, the three digital readouts are on an auxiliary panel which can be readily attached to the face of the artificial horizon instrument. In a second embodiment, the three digital readouts are embodied in the glass cover of the artificial horizon instrument. In a third and fourth embodiment, only the direction digital readout is embodied in the auxiliary panel or in the glass cover.

The air speed and altitude signals are derived from available air speed and altitude signal sources. The directional signal is derived from a modified artificial horizon instrument in which a directional indicating flux unit is incorporated into the gyroscope and is connected through leads to an appropriate signal processor from which the signal is fed to the digital display on the face of the artificial horizon instrument.

DESCRIPTION OF PREFERRED EMBODIMENT

Figure 1:
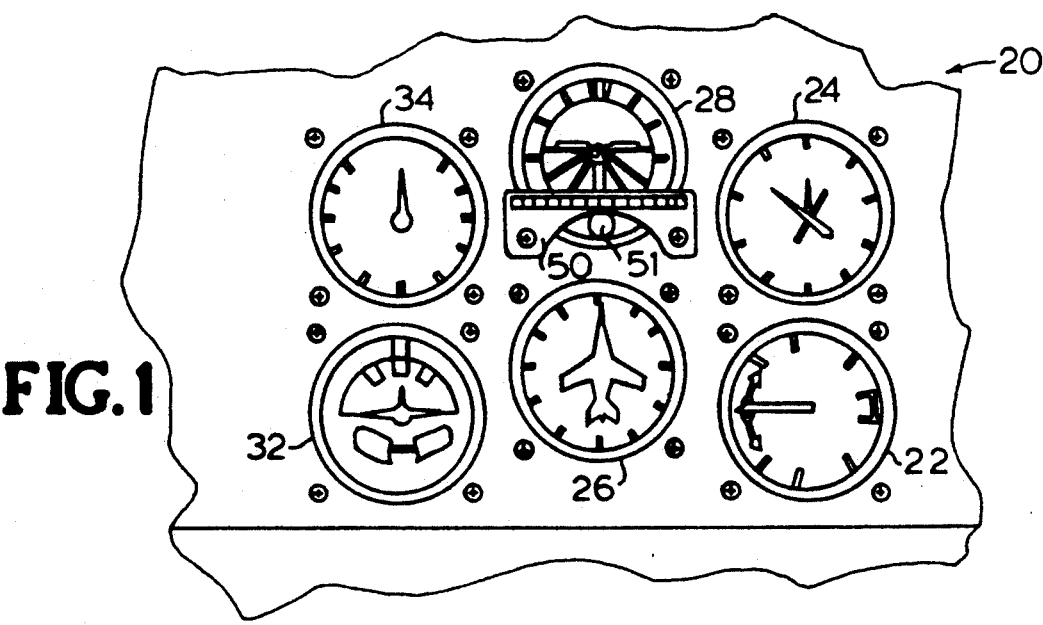
FIG. 1 is a front elevation view of a portion of a light aircraft instrument panel modified according to the invention.

Making reference to the drawings, FIG. 1 illustrates a portion of a typical light aircraft instrument panel 20 having a vertical speed indicator 22, an altimeter 24, a compass 26, an artificial horizon instrument 28 having an attached digital display panel 50 according to the invention, a turn indicator 32 and an air speed indicator 34. As has been previously mentioned, a primary object of the invention is to provide a digital display of air speed, altitude and direction on the face of the artificial horizon instrument 28. The description will first describe the various embodiments directed to the digital display and then will be directed to the digital display signal sources and particularly to the directional signal source in reference to FIGS. 10 and 11.

Figure 2:
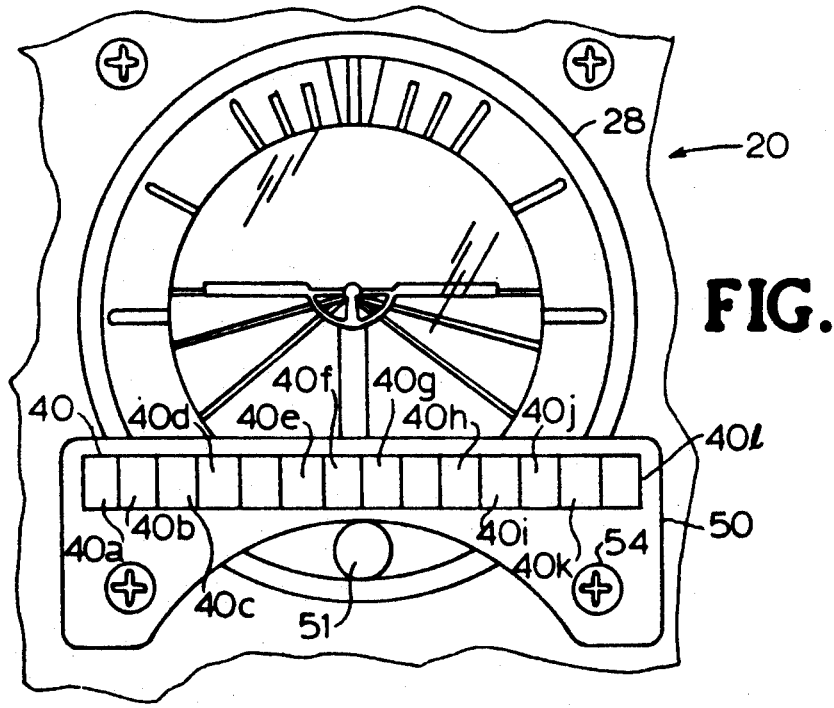
FIG. 2 is a front elevation view of a conventional artificial horizon instrument modified by the addition of an auxiliary digital display panel according to the invention.
Figure 3:
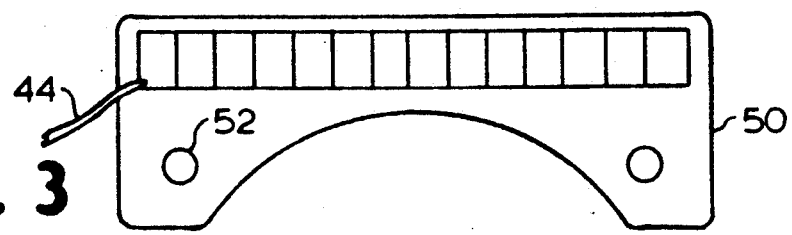
FIG. 3 is a rear elevation view of the digital display panel seen in FIG. 2.
Figure 4:
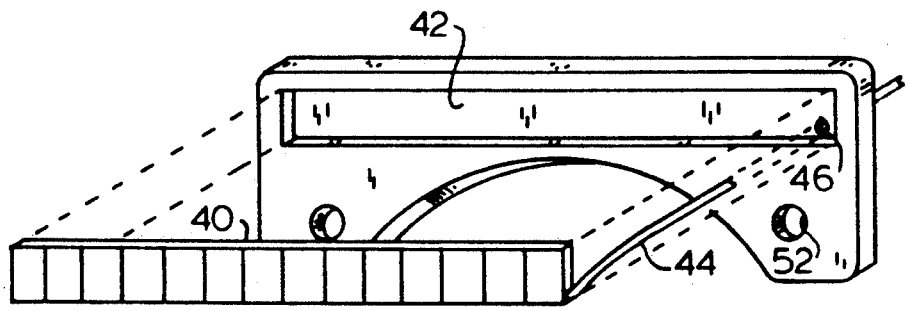
FIG. 4 is a front perspective and exploded view of the digital display panel and digital display strip which is mounted in a recess formed in the panel.

In a first embodiment illustrated in FIGS. 2-4, a conventional pre-fabricated digital display strip 40 either of the LED (light emitting diode) or LCD (liquid crystal display) type is mounted in a mating recess 42 and its signal cable 44 is fed through a hole 46 (FIG. 4) both of which are formed in a panel 50. Panel 50 is shaped to clear the adjustment knob 51 and is formed with screw holes 52 (FIG. 4) for receiving the existing mounting screws 54. While not shown it is to be understood that cable 44 is fed through a small hole formed in the instrument panel 20 and is fed to the appropriate signal sources later described in reference to FIG. 11.

Strip 40 includes three digital displays 40a, 40b, 40c, 40d for displaying a four digit air speed, three digital displays 40e, 40f, 40g, for displaying a three digit direction and five digital displays 40h, 40i, 40j, 40k, 40l for displaying a five digit altitude. Thus, it will be seen that the pilot is able to read simultaneously at one location and in digital form air speed, direction and altitude. Also to be recognized is that the conventional instruments are undisturbed, that the addition of the auxiliary panel 50 does not disturb the normal operation of the artificial horizon instrument 28 and that panel 50 can be secured by the existing mounting screws 54. Thus, only a small hole is required to be drilled in panel 20 for lead 44.

Figure 5:
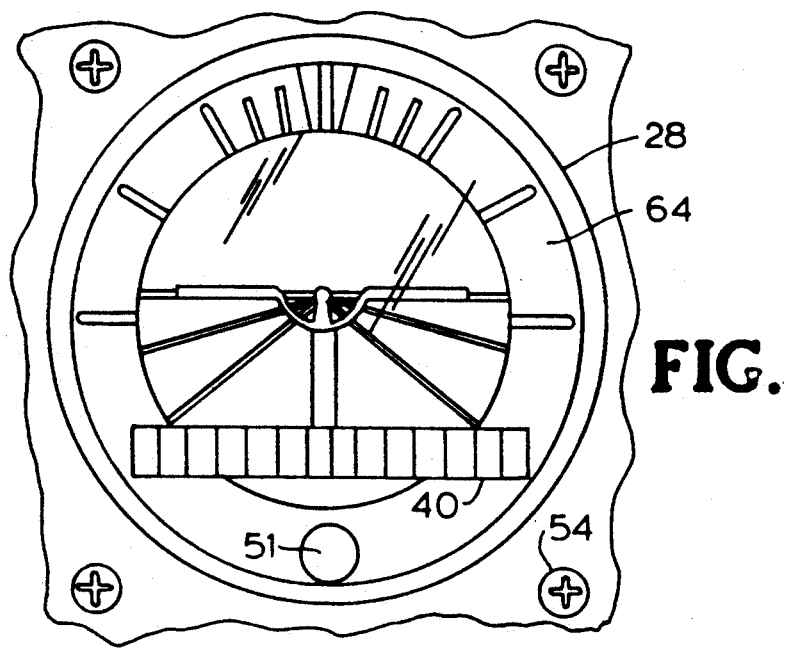
FIG. 5 is a front elevation view of a digital display strip mounted in the glass cover of the artificial horizon instrument.
Figure 6:
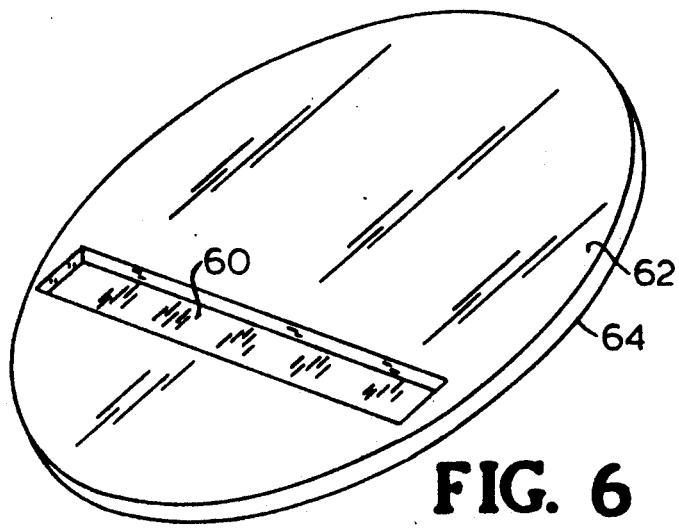
FIG. 6 is a rear perspective view of the glass cover of the artificial horizon instrument modified according to the invention.
Figure 7:
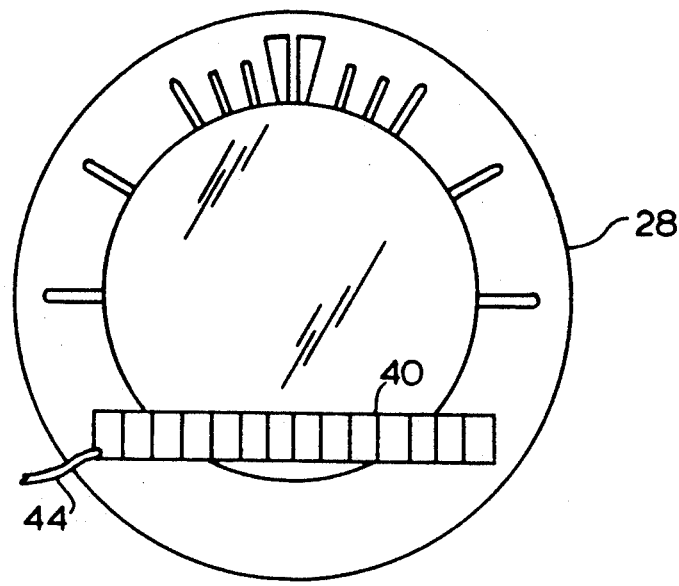
FIG. 7 is a rear elevation view of the modified artificial horizon instrument glass cover seen in FIG. 5.

In a second embodiment illustrated in FIGS. 5-7, the digital display strip 40 is mounted in a recess 60 formed on the rear face 62 of the conventional glass cover 64 for the artificial horizon instrument 28 and the cable lead 44 is fed through the panel 20 to the appropriate signal sources. Thus, the pilot is able to see simultaneous digital readings of air speed, direction and altitude at the same location as the artificial horizon instrument 28 thereby eliminating having to scan several instruments as with conventional instrumentation.

Figure 8:
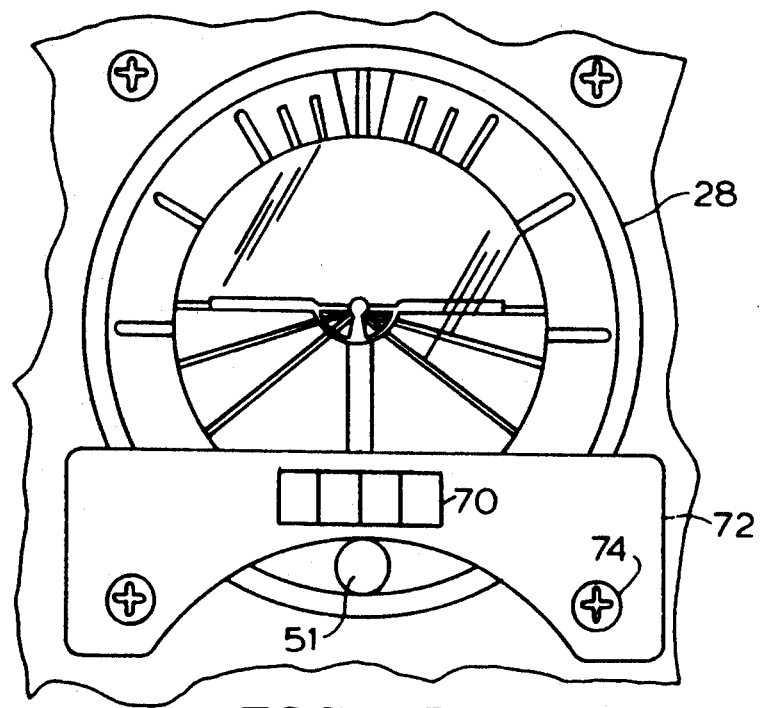
FIG. 8 is a front elevation view of the artificial horizon instrument modified with an auxiliary digital display panel indicating direction only.

In a third embodiment illustrated in FIG. 8, a digital display strip 70 is mounted in a recess, not shown, formed in panel 72 in the manner of FIG. 4 and is secured by the existing mounting screws 74 but in this instance only displays direction in four digits. However, both direction and the artificial horizon provided by instrument 28 are now available for viewing at a single location and which has not been possible with prior instruments.

Figure 9:
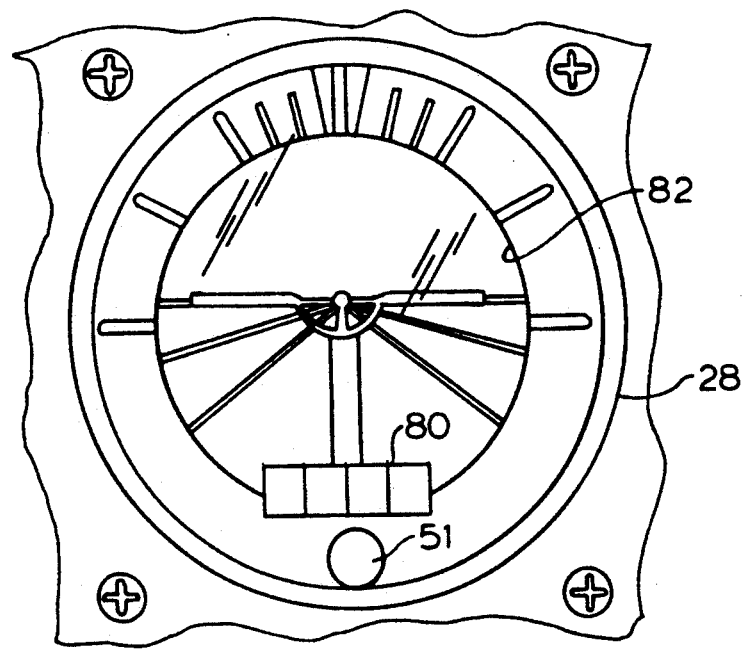
FIG. 9 is a front elevation view of the artificial horizon instrument modified to receive a directional digital display only in the glass cover of the instrument similiar to the construction of FIGS. 5-7 but limited to a direction display only.

In a fourth embodiment, generally illustrated in FIG. 9, the digital display strip 80 is mounted in a recess, not shown, in the rear face of the cover glass 82 in the manner of FIGS. 5-7. As with the third embodiment, only direction is sensed and displayed but such display of direction is now made possible at the same location as the artificial horizon instrument 28.

While not shown it is also to be understood that the digital display strip may be adhered to the face of the cover glass.

Figure 10:
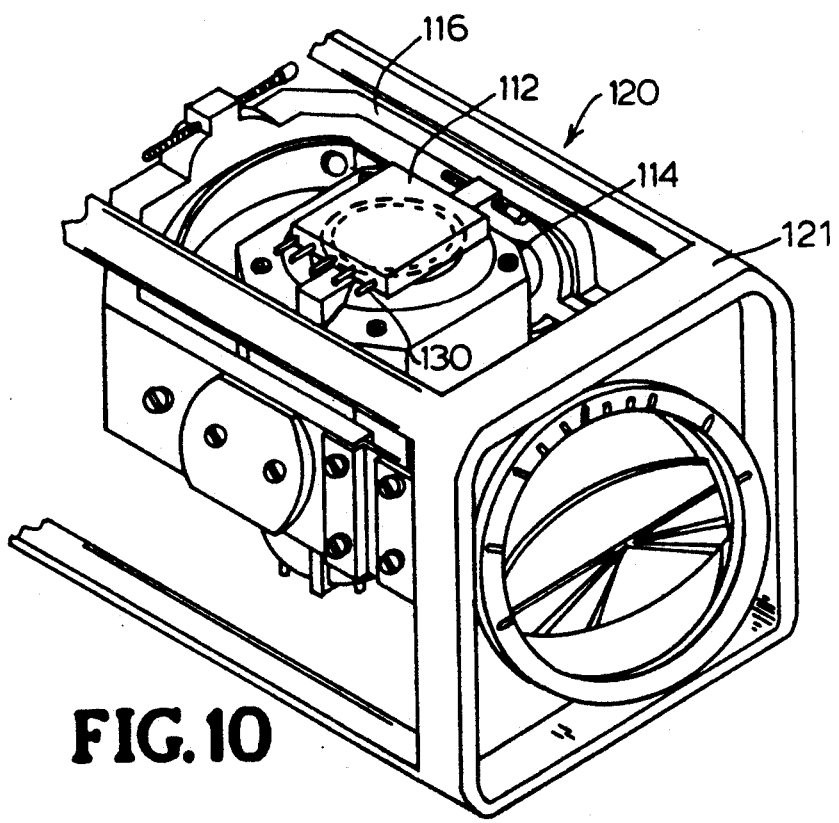
FIG. 10 is a partial perspective view of an artificial horizon instrument modified according to the invention with the housing removed.
Figure 11:
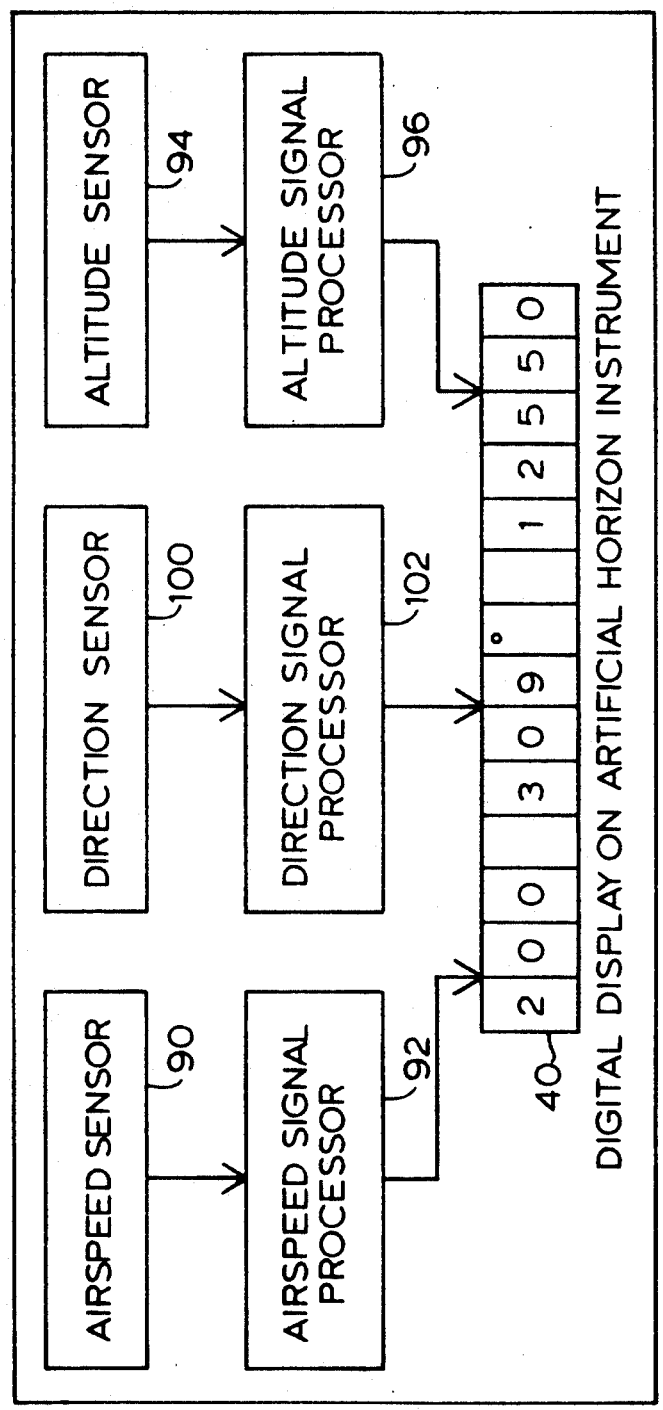
FIG. 11 is a schematic diagram of the direction signal sensing and display system of the invention incorporated into a conventional artificial horizon instrument.

Referring next to FIGS. 10 and 11, there is illustrated the manner in which the various air speed, direction and altitude digital display forming signals may be obtained. From this description, those skilled in the art will readily appreciate the many forms in which the invention may be implemented. The air speed sensor 90 and air speed signal processor 92, generally indicated in FIG. 11, may comprise, by way of example, a conventional air speed indicator converted to produce a digital signal. An air speed indicator made by BEI Motion Systems, Inc. of Carlsbad, Calif. is available with an infrared pick up disc and digital output suited to the invention. The altitude sensor 94 and altitude signal processor 96 also generally indicated in FIG. 11 may comprise, by way of example, a Trans Cal Model SSD Mode C encoder with a digital output as made by Trans Cal, Inc. of Van Nuys, Calif.

Of special interest to the invention is the direction sensor 100 and direction signal processor 102 generally indicated in FIG. 11. For this purpose as best seen in FIG. 10, a remote flux gate sensor 112 is mounted on the gyroscope housing 114 of a conventional artificial horizon instrument 120 of the type made by Castleberry Instruments Corporation of Austin, Tex. The flux gate sensor 112 may be of the type used in a hiking compass as made by Nautech, Ltd., Anchorage Park, Portsmouth, Hampshire, England and includes the necessary solid state circuitry to produce the desired digital output. The indicated five leads 130 are fed through so-called Litz wire conductors, not shown, to slip rings, not shown, in a conventional manner and through wire brushes, not shown, contacting the slip rings to the outside digital display wherein the direction is displayed in digital form. The gyroscope housing 114 houses the energized gyroscope spin element and mounts in a gimbal 116. The gyroscope and gimbal in the conventional artificial horizon instrument mount within the space defined by the instrument frame 121 only a portion of which is seen in FIG. 10. Gimbal 116 pivots at its trailing end on its own longitudinal axis and also provides a crosswise axis passing through gyroscope housing 114 about which gyroscope housing 114 pivots all of which constitutes conventional construction. Thus, as the aircraft turns, the direction flux gate sensor 112 is held level and gives an accurate signal indicative of direction.

In summary, at least these advantages are achieved:
(a) No alteration of the artificial horizon instrument is required since the auxiliary display panel can be mounted using the existing mounting screws. Only a small hole of approximately ⅛" size is required to be drilled for passing the digital display wires through the instrument panel to the signal source equipment.

(b) Accuracy of one (1) degree compared to up to four (4) degrees error in present light aircraft magnetic compass.

(c) Substantial reduction in weight. The invention equipment may weigh only a few ounces compared to several pounds weight for the equipment replaced.

(d) The floating magnetic compass, remote indicating compass and directional gyro are all replaced by the invention equipment.

(e) Flight safety is dramatically improved by reason of the pilot not having to scan plural instruments.

(f) Since the invention instrument is appropriately mounted and is also solid state, the following errors inherent in the wet compass are eliminated:
Precession
Acceleration and deceleration dip
Oscillation (g) The invention compass does not have to be reset periodically with the magnetic compass because the invention compass is the magnetic compass.

I claim:

1. An improved gyroscopically stabilized artificial horizon instrument for an aircraft capable of both displaying an artificial horizon and generating a signal representative of flight direction, said instrument comprising:

(a) a frame defining an enclosed space and mounted within the aircraft;

(b) a gimbal structure mounted on the frame pivoting around a first axis extending lengthwise of the frame;

(c) an energized gyroscope mounted for pivoting about a second axis passing through the gimbal and having a housing through which said second axis extends, said second axis being perpendicular to the first axis;

(d) artificial horizon display means operatively associated with said frame, gimbal structure, gyroscope and housing for displaying an artificial horizon in response to changing positions of the aircraft during flight;

(e) an earth magnetic field sensitive flux sensor mounted on said gyroscope housing in a position which permits said earth magnetic field sensitive flux sensor to remain level during changing positions of the aircraft and operable to produce a signal indicative of the direction in which said aircraft is headed in response to changing positions of the aircraft during flight relative to the earth's magnetic field;

(f) converter means for receiving said signal from said sensor and converting said signal to a form suited for digital display; and (g) display means operable to receive and display said converted signal as a visual display of direction and located on the aircraft at a location which enables a pilot of the aircraft to view both the artificial horizon display and a digital display of direction.

2. An improved gyroscopically stabilized artificial horizon instrument as claimed in claim 1 wherein said display means is located proximate said display of artificial horizon.

3. An improved gyroscopically stabilized artificial horizon instrument as claimed in claim 1 wherein said display means comprises a digital display mounted on a panel secured to said instrument below said artificial horizon display.

4. An improved navigation instrument as claimed in claim 1 wherein said artificial horizon display means includes a cover member and said display means comprises a digital display mounted on said cover member.

5. An improved gyroscopically stabilized artificial horizon instrument as claimed in claim 1 including slip ring-brush means located for receiving and transferring said signal from said flux sensor to said convertor means.

* * * * *

UNITED STATES PATENT AND TRADEMARK OFFICE
CERTIFICATE OF CORRECTION

PATENT NO.  : 5,134,394
DATED       : July 28, 1992
INVENTOR(S) : Leigh P. Beadle It is certified that error appears in the above-identified patent and that said Letters Patent is hereby corrected as shown below:

Column 3, line 38, "three" should read --four--.

Signed and Sealed this

Fifth Day of April, 1994

Attest:

BRUCE LEHMAN

Attesting Officer    Commissioner of Patents and Trademarks